United States Patent [19]

Rule

[11] Patent Number: 4,481,314

[45] Date of Patent: Nov. 6, 1984

[54] INFRARED RADIATION ABSORBENT ANTHRAQUINONE DERIVATIVES IN POLYESTER COMPOSITIONS

[75] Inventor: Mark Rule, Kingsport, Tenn.

[73] Assignee: Eastman Kodak Company, Rochester, N.Y.

[21] Appl. No.: 509,112

[22] Filed: Jun. 29, 1983

[51] Int. Cl.$^3$ .................. C08K 5/42; C08K 5/18; C09K 15/24

[52] U.S. Cl. .................. 524/88; 252/587; 524/156; 524/160; 524/199; 524/206; 524/207; 524/239; 524/242; 528/288; 528/292; 427/53.1

[58] Field of Search .............. 524/156, 160, 199, 206, 524/207, 239, 242, 88; 562/461; 564/427; 528/292, 288; 560/10, 25, 44, 48; 252/587

[56] References Cited

U.S. PATENT DOCUMENTS

| | | | |
|---|---|---|---|
| 1,841,674 | 1/1932 | Rintelman et al. | 260/376 |
| 3,278,486 | 10/1966 | Meek et al. | 528/190 |
| 3,359,230 | 12/1967 | Bowman et al. | 524/207 |
| 3,372,138 | 3/1968 | Bowman et al. | 524/242 |
| 3,424,708 | 1/1969 | Bowman et al. | 524/718 |
| 3,926,835 | 12/1975 | Tucker | 252/587 |
| 3,992,421 | 11/1976 | Botros | 524/242 |
| 4,001,169 | 1/1977 | Cheetham et al. | 524/242 |
| 4,359,570 | 11/1982 | Davis et al. | 528/289 |

*Primary Examiner*—Veronica P. Hoke
*Attorney, Agent, or Firm*—Donald W. Spurrell; Daniel B. Reece, III

[57] ABSTRACT

Disclosed are novel anthraquinone compounds containing tetra-p-phenylenediamine substituents, particularly useful in molding type polyester compositions and possessing strong infrared absorptivity. This property renders these compounds attractive as additives for increasing the infrared energy absorptivity of polyesters either from high intensity quartz lamps or from certain laser systems. These compounds are particularly useful in bottle polyester material for increasing the blow-mold parison reheat rate, and in the printing of plastic articles with lasers.

14 Claims, No Drawings

INFRARED RADIATION ABSORBENT ANTHRAQUINONE DERIVATIVES IN POLYESTER COMPOSITIONS

DESCRIPTION

This invention concerns novel infrared radiation (hereinafter termed infrared) absorbent compounds and polyester compositions and articles containing the same. The present compounds blended or copolymerized with polyesters increase the infrared absorbtivity thereof from high intensity quartz lamps or certain laser systems. The compounds are quite thermally stable and particularly useful, for example, in bottle polyester for increasing the injection molded, blow-molding bottle parison (blow-molding preform) reheat rate, and in polyester articles to be printed with laser radiation. The compounds are also fast to light and are not extractable from the polyester, properties especially valuable in food applications such s blow-molded beverage bottles and the like.

The novel infrared absorbent compounds of this invention comprise anthraquinone having in the 1, 4, 5 and 8 positions diamino substituents independently selected from those of the formula

wherein $R^6$ and $R^7$ are each selected independently from hydrogen, straight or branched alkyl radicals, cycloalkyl radicals, and aryl radicals wherein said radicals are unsubstituted or substituted with 1–3 radicals different from the parent radical and independently selected from alkyl, cycloalkyl, aryl, alkoxy, alkylamino, alkylsulfonyl, alkylsulfonylamino, alkanoylamino, aroylamino, alkylthio, arylamino, amino, cycloalkylamino, alkanoyl, alkoxycarbonyl, alkanoyloxy, aroyl, arylsulfonyl, $CF_3$, arylsulfamoyl, cyano, halogen, hydroxy, nitro, sulfamoyl, alkylsulfamoyl, dialkylsulfamoyl, carbamoyl, alkylcarbamoyl, dialkylcarbamoyl, $SO_3M$, $OSO_3M$, and $COOR^8$ wherein $R^8$ is H, alkyl or hydroxyalkyl, M is $H^+$, $Na^+$, $K^+$ or $NH_4^+$, and wherein the above alkyl radicals and alkyl moieties (segments) of the other radicals such as alkylamino are straight or branched chain of from 1–20 carbons, the cycloalkyl radicals or moieties have 4–8 ring carbons, and the aryl radicals or moieties have 6–10 ring carbons. Preferred for $R^6$ and $R^7$ are straight or branched alkyl of 1–10 carbons, cyclohexyl, or phenyl.

The following table gives exemplary compounds of the present invention according to the general formula

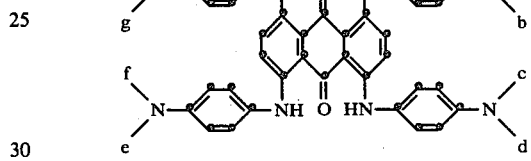

wherein the various alkyl groups, e.g., $C_6H_{13}$, can be singular but typically are mixtures of isomers, and wherein a designation such as $C_6H_{12}$-$OC_2H_5$ means that the alkoxy (or other substituent) is on the end carbon of the alkyl moiety.

| a | b | c | d |
|---|---|---|---|
| H | $CH_3$ | H | $CH_3$ |
| $C_2H_5$ | $C_2H_5$ | $C_2H_5$ | $C_2H_5$ |
| $C_4H_9$—n | $C_4H_9$—n | $C_3H_7$—n | $C_3H_7$—n |
| $C_8H_{17}$ | $C_8H_{17}$ | $C_{12}H_{25}$ | $C_{12}H_{25}$ |
| Ph | Ph | $C_6H_{11}$ | $C_6H_{11}$ |
| $CH_2CH_2CN$ | $CH_2CH_2CN$ | $CH_2$—$C_6H_{11}$ | $CH_2$—$C_6H_{11}$ |
| $C_6H_{12}$—$OC_2H_5$ | $C_6H_{12}$—$OC_2H_5$ | $CH_2$—$C_6H_{11}$ | $CH_2$—$C_6H_{11}$ |
| $C_4H_8$—$NHCH_3$ | $C_4H_8$—$NHCH_3$ | $CH_2$—$SO_2CH_3$ | $CH_2$—$SO_2CH_3$ |
| $C_6H_{12}$—$NHCOCH_3$ | $C_6H_{12}$—$NHCOCH_3$ | $CH_2CH_2$—$NHCOPh$ | $CH_2CH_2$—$NHCOPH$ |
| $CH_2NHPh$ | $CH_2NHPh$ | $CH_3$ | $CH_3$ |
| $CH_2CH_2NH_2$ | $CH_2CH_2NH_2$ | $C_{16}H_{33}$ | $C_{16}H_{33}$ |
| $CH_2NHC_6H_{11}$ | $CH_2NHC_6H_{11}$ | $C_{16}H_{33}$ | $C_{16}H_{33}$ |
| $CH_2CH_2COC_2H_5$ | $CH_2CH_2COC_2H_5$ | $CH_2CH_2COOCH_3$ | $CH_2CH_2COOCH_3$ |
| $CH_2SO_2Ph$ | $CH_2SO_2Ph$ | $C_6H_{12}$—$CF_3$ | $C_6H_{12}$—$CF_3$ |
| $CH_2CHClCH_2Cl$ | $CH_2CHClCH_2Cl$ | $C_6H_{10}$—p-Cl | $C_6H_{10}$—p-Cl |
| $CH_2CH_2$—$NO_2$ | $CH_2CH_2$—$NO_2$ | $C_6H_{10}$—p-COOH | $CH_3$ |
| $CH_2SO_2NHCH_3$ | $CH_2SO_2NHCH_3$ | $CH_2CH_2SO_2N(C_2H_5)_2$ | $CH_2CH_2SO_2N(C_2H_5)_2$ |
| $CH_2CONHCH_3$ | $CH_2CONHCH_3$ | $CH_2CH_2CON(CH_3)_2$ | $CH_2CH_2CON(CH_3)_2$ |
| $CH_2$—$C_6H_{10}$—p-$COOCH_3$ | $CH_2$—$C_6H_{10}$—p-$COOCH_3$ | $CH_3$ | $CH_3$ |
| $CH_2$—$C_6H_4$—p-$NO_2$ | $CH_2$—$C_6H_4$—p-$NO_2$ | $C_9H_{19}$ | $C_9H_{19}$ |

| e | f | g | h |
|---|---|---|---|
| $CH_3$ | $CH_3$ | $CH_3$ | $CH_3$ |
| $C_2H_5$ | $C_2H_5$ | $C_2H_5$ | $C_2H_5$ |
| $C_4H_9$—n | $C_4H_9$—n | $CH_3$ | $CH_3$ |
| $C_6H_{11}$ | $C_6H_{11}$ | $C_4H_9$ | $C_4H_9$ |
| $C_{12}H_{25}$ | $C_{12}H_{25}$ | $C_4H_9$ | $C_4H_9$ |
| $C_{12}H_{25}$ | $C_{12}H_{25}$ | $CH_2CH_2CH_2Cl$ | $CH_2CH_2CH_2CH_2Cl$ |
| $C_{12}H_{25}$ | $C_{12}H_{25}$ | $CH_2CH_2CH_2Cl$ | $CH_2CH_2CH_2Cl$ |
| $CH_2CH_2NHSO_2CH_3$ | $CH_2CH_2NHSO_2CH_3$ | $CH_3$ | $CH_3$ |
| $C_5H_{10}$—$SC_3H_7$—n | $C_5H_{10}$—$SC_3H_7$—n | $C_6H_{11}$ | $C_6H_{11}$ |
| H | $CH_3$ | H | $CH_3$ |
| Ph | Ph | $C_6H_{10}$—p-$CH_3$ | $C_6H_{10}$—p-$CH_3$ |
| Ph—p-$CH_3$ | Ph—p-$CH_3$ | $C_6H_{10}$—p-Cl | $C_6H_{10}$—p-Cl |
| $CH_3OOCCH_3$ | $CH_3OOCCH_3$ | $C_5H_{10}$—$COPH$ | $C_5H_{10}$—$COPh$ |
| $CH_2SO_2NHPh$ | $CH_2SO_2NHPH$ | $CH_2CH_2CN$ | $CH_2CH_2CN$ |

| | | | |
|---|---|---|---|
| C6H4—p-OCH3 | C6H4—p-OCH3 | C6H4—p-CN | C6H4—p-CN |
| C6H4—p-COOH | C12H25 | CH2CH2SO2NH2 | CH2CH2SO2NH2 |
| C6H10—p-CONH2 | C6H10—p-CONH2 | C6H4—p-SO3Na | C6H4—p-SO3Na |
| C6H10—p-OH | C6H10—p-OH | CH2CH2CH2—OH | CH2CH2CH2—OH |
| C6H9—o,p-di-Cl | C6H9—o,p-di-Cl | C6H2—o,m,p-tri-Cl | C6H2—o,m,p-tri-Cl |
| C4H9—n | C4H9—n | C6H11 | C6H11 |

These compounds generally possess a $\lambda_{max}$ in the region of from about 300 to about 1000 nanometers, and in certain instances in the region of about 780 nanometers ($\epsilon = 20,000$) and a weaker absorption in the region of about 440 nanometers ($\epsilon = 5,000$). These wavelengths are considered herein to be sufficiently close to art recognized infrared wavelengths to be termed infrared. These compounds or mixtures thereof are used in concentrations of from 1-20,000 parts per million of polyester (hereinafter ppm), preferably 10-1,000, and most preferably 20-100 ppm, and can be present in blended form or as an integral part of the polyester resulting, for example, from reaction of -COOR$^8$ groups with the ethylene glycol during esterification in the polyester preparation. For such reactive compounds, it is preferred that no more than two —COOR$^8$ groups be present such that excessive chain branching does not occur.

The present compounds are generally prepared, for example, by refluxing 1,5-dichloro-4,8-dinitroanthraquinone or 1,4,5,8-tetrachloroanthraquinone with a p-phenylenediamine type reactant in a high boiling solvent, such as ethylene glycol or dimethylformamide. An inert atmosphere is preferred but not necessary. Thus, 1,4,5,8-tetrakis(p-dimethylaminoanilino) anthraquinone (TDAA) was prepared by reacting 1.0 g. of 1,5-dichloro-4,8-dinitroanthraquinone with 50 ml. of N,N-dimethyl-p-phenylenediamine in 50 ml. of ethylene glycol at reflux for five hours. The reaction product was isolated by dilution of the reaction mixture with water followed by filtration, and possessed a $\lambda_{max}$ of 783 nanometers ($\epsilon = 20,000$). This compound, having a green color, was stable and unchanged after heating for two hours at 285° C. in glycerol. The p-diethylaminoanilino derivative (TDEAA) was similarly prepared and had essentially the same properties.

The present compounds can be added at any stage of the polyester preparation or thereafter to the polyester by techniques well known to the art. One such technique which was employed for the present invention is as follows:

Ten milligrams of the above infrared absorbent compound TDAA was solvent-coated onto 200 g of poly-(ethylene terephthalate) (PET) pellets having an inherent viscosity (I.V.) of 0.72, using a 50/50 by wt. mixture of PET pellets in methylene chloride. This product was dried at 125° C. under vacuum and molded into 50 mil thick amorphous polyester disks at 265° C. The disks were light green in color and exhibited a 7% increase in heat absorption rate under quartz lamp illumination relative to a control of identical PET but containing no infrared absorbent compound. The ultraviolet to visible absorption spectrum of the disks show that this compound was unaffected by the thermal treatment.

Various colorants such as the condensable dyes of U.S. Pat. Nos. 4,359,570; 3,372,128; 3,278,486; 3,359,230; 3,424,708; and 1,841,674 are typically used in conjunction with the present compounds in accordance with the present invention to give polyester of varying colors such as green, amber, and blue. Dyes particularly useful herein are those of said U.S. Pat. No. 4,359,570 having the general formula

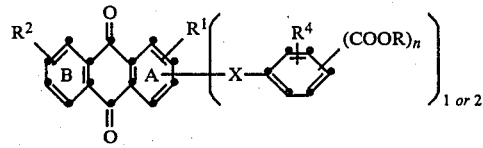

wherein: either or both of rings A and B may contain in any position thereon one or two groups of the formula

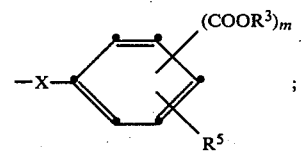

R and $R^3$ each is hydrogen, lower alkyl or lower hydroxyalkyl; $R^1$, $R^2$, $R^4$ and $R^5$ each represents hydrogen or 1-3 substituents independently selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkanoylamino, arylamino, arylthio, aroylamino, lower alkylsulfonyl, lower alkylthio, lower alkanoylamino, and cyclohexylamino, wherein each aryl moiety is 6-10 carbons and the term "lower" as used herein means 1-6 carbons; X is —S— or —NH—; n is 1 or 2; and m is 0, 1, or 2.

The preferred dyes within the above definition are those in which at least one —COOR or —COOR$^3$ group is in the ortho position on each benzene ring with respect to the —X—linkage, and the most preferred dyes have the formulas

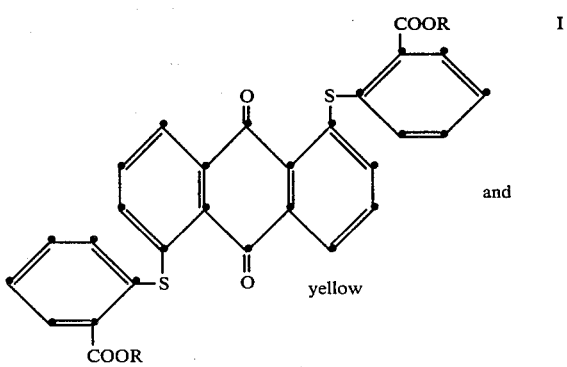

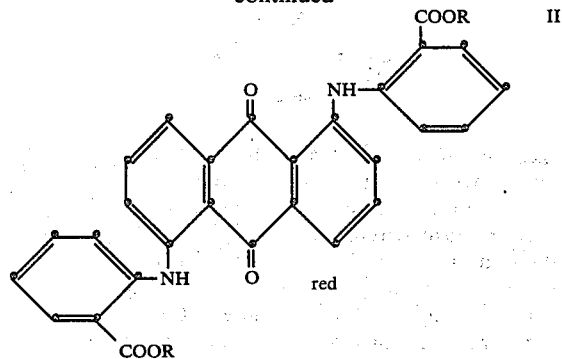

II red

Brightly colored polyester compositions can be obtained by copolymerization with from about 1 ppm up to about 3.0 wt. % of one or more of the above dyes, and with 1–20,000 ppm of one or a mixture of any of the present compounds, either blended with the polyester or actually copolymerized therein, which compositions can be blow-molded into bottles or molded or otherwise formed into useful articles such as food packages. A large variety of colors can be obtained with mixtures of the above dyes and also by mixing therewith various pigments including carbon black, copper phthalocyanine, and $TiO_2$. Also, fillers and the like may be admixed with the colored compositions to give certain effects supplementary to the dyes.

The present polyester compositions are prepared, e.g., as follows:

EXAMPLE 1

Copolymerizing the Dye and Present Compound Into The Polyester 145.5 Grams (0.75 mole) of dimethyl terephthalate,
89.0 grams (1.44 moles) of ethylene glycol,
32.8 grams (0.23 mole) of 1,4-cyclohexanedimethanol,
120.0 ppm of Ti catalyst as titanium tetraisopropoxide,
200.0 ppm of the yellow dye 1,5-bis(2-carboxyphenylthio)-anthraquinone, and
50 ppm of the present infrared absorbent compound A of the formula are added to a 500-ml. round-bottom flask fitted with a stirrer, condensate take-off, and nitrogen inlet head. The flask and contents are immersed in a Woods metal bath at approximately 170° C. The temperature is raised to 195° C. The temperature is raised to 195° C. and maintained for two hours and twenty minutes while ester exchange and esterification of the dimethyl terephthalate, ethylene glycol, 1,4-cyclohexanedimethanol, 1,5-bis(2-carboxyphenylthio)-anthraquinone, and compound A occurs. During all of the above reactions, a nitrogen purge of approximately two cubic feet/hour is maintained over the reactants. The temperature is then raised to 285° C., the melt placed under 0.10 mm. vacuum and polycondensation carried out for 50 minutes.

The inherent viscosities (I.V.) of the polyesters herein are in deciliters/gram and are determined according to ASTM D2857-70 procedure in a Wagner Viscometer of Lab Glass Inc. of Vineland, N.J., having a ½ ml. capillary bulb, using a polymer concentration of 0.5% by weight in 60/40, phenol/tetrachloroethane, by weight. The procedure is carried out by heating the polymer-solvent system at 120° C. for 15 minutes, cooling the solution to 25° C. and measuring the time of flow at 25° C. The I.V. is calculated from the equation $$\{n\}_{0.05\%}^{25°C} = \frac{\ln \frac{t_s}{t_o}}{C}$$

wherein:
$\{n\}$ = Inherent viscosity at 25° C. at a polymer concentration of 0.50 g./100 ml. of solvent;
ln = Natural logarithm;
$t_s$ = Sample flow time;
$t_o$ = Solvent-blank flow time; and
C = Concentration of polymer in grams per 100 ml. of solvent=0.50.

Exemplary of the wide variety of useful polyesters are those prepared from major amounts of either 1,4-cyclohexanedimethanol or ethylene glycol or mixtures thereof, and up to about 30 mole % of one or a mixture of modifying diols such as 1,2-propanediol, 1,3-propanediol, 1,2-butanediol, 2,3-butanediol, 1,3-butanediol, 1,4-butanediol, 2,2-dimethyl-1,3-propanediol, 2,3-propanediol, 1,6-hexanediol, 2-ethylhexanediol, 1,2-cyclohexanediol, 1,4-cyclohexanediol,

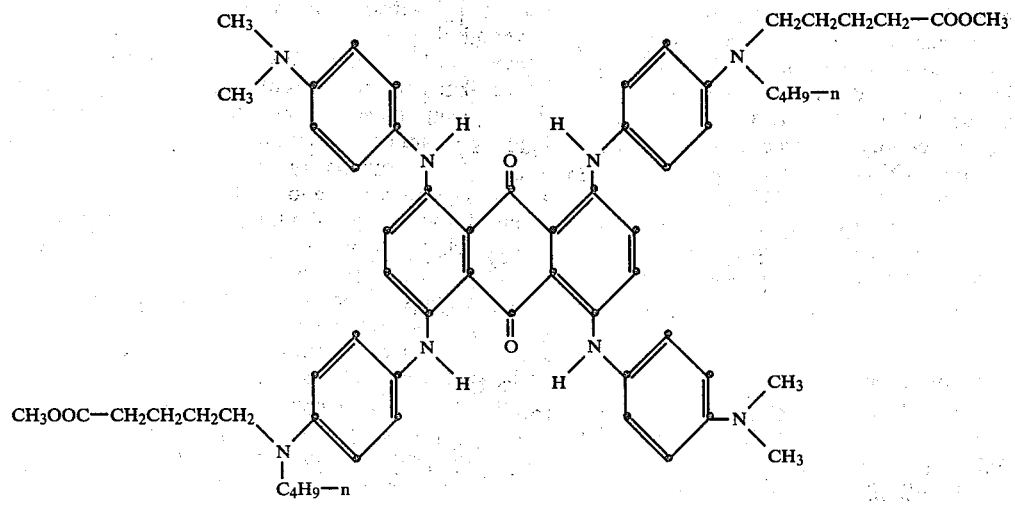

1,2-cyclohexanedimethanol, 1,3-cyclohexanedimethanol, and diols containing one or more oxygen atoms in the chain, e.g., diethylene glycol, triethylene glycol, dipropylene glycol or tripropylene glycol. In general, useful diols contain 2 to 18, preferably 2 to 12 carbon atoms.

The acids used to form these various polyesters are selected from one or more cyclic or acyclic dicarboxylic acids. The term "acid" as used herein including the claims includes the anhydride or other reactive species such as esters, i.e., dimethyl terephthalate or the like. Preferred are major amounts of terephthalic or isophthalic or mixtures thereof, and up to about 30 mole % of one or a mixture of modifying acids such as hexahydroterephthalic, tetrahydrophthalic, hexahydrophthalic, hexahydroisophthalic, endomethylenetetrahydrophthalic, endoethylenetetrahydrophthalic, hexachloroendomethylenetetrahydrophthalic, tetrabromophthalic, succinic, glutaric, adipic, suberic, sebacic, decanedicarboxylic, 2,2,4-trimethyladipic, maleic, fumaric, itaconic, citraconic and the like.

The polyesters can be produced according to conventional processes, e.g., with a catalyst such as titanium added as titanium tetraisopropoxide, with or without the introduction of an inert gas stream, as solution condensation in a solvent, or as a melt condensation at temperatures of up to about 250° C., or higher.

The anthraquinone dye components comprise coloring amounts, i.e., from about 1.0 to about 5,000 and preferably from about 2.0 to about 1500 parts of each dye per million parts of polyester (ppm). The colored compositions are broadly defined as linear thermoplastic polyesters containing a coloring amount of the residue of one or a mixture of the dyes within the above general formula, and from 1 to 20,000 ppm of one or a mixture of the present compounds. Preferred of these are the linear thermoplastic polyesters having an I.V. of from about 0.65 to about 0.8, prepared from at least about 90 mole percent terephthalic acid, and a diol component comprised of at least about 90 mole percent ethylene glycol, up to about 10 mole % 1,4-cyclohexanedimethanol and up to about 5 mole % diethylene glycol, and containing from about 2.0 to about 1500 ppm of one or a mixture of the above copolymerized dyes, and from about 10 to about 1,000 ppm of one or a mixture of the present infrared absorbent compounds.

An especially preferred polyester composition is prepared from dimethyl terephthalate and a diol component comprising ethylene glycol, up to about 5 mole % of diethylene glycol, and up to about 5 mole % of 1,4-cyclohexanedimethanol based on total moles of diol, and contains from about 2.0 to about 1500 ppm of one or a mixture of the above copolymerized dyes I and II, and from about 20 to about 100 ppm of one or a mixture of the above compounds TDAA and TDEAA.

The invention has been described in detail with a particular reference to preferred embodiments thereof, but it will be understood that variations and modifications can be effected within the spirit and scope of the invention.

I claim:

1. A polyester composition comprising linear thermoplastic polyester containing from about 1 to about 20,000 ppm of one or a mixture of infrared absorbent compounds comprising anthraquinone having in the 1, 4, 5 and 8-positions diamino radicals independently selected from those of the formula

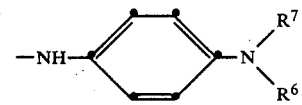

wherein $R^6$ and $R^7$ are each selected independently from hydrogen, straight or branched alkyl radicals, cycloalkyl radicals, and aryl radicals, wherein said radicals are unsubstituted or substituted with 1–3 radicals different from the parent radical and independently selected from alkyl, cycloalkyl, aryl, alkoxy, alkylamino, alkylsulfonyl, alkylsulfonylamino, alkanoylamino, aroylamino, alkylthio, arylamino, amino, cycloalkylamino, alkanoyl, alkoxycarbonyl, alkanoyloxy, aroyl, arylsulfonyl, $CF_3$, arylsulfamoyl, cyano, halogen, hydroxy, nitro, sulfamoyl, alkylsulfamoyl, dialkylsulfamoyl, carbamoyl, alkylcarbamoyl, dialkylcarbamoyl, $SO_3M$, $OSO_3M$, $COOR^8$ wherein $R^8$ is H, lower alkyl or lower hydroxyalkyl, and wherein M is $H^+$, $Na^+$, $K^+$ or $NH_4^+$.

2. The composition of claim 1 containing a coloring amount of a dye component comprising the copolymerized residue of one or a mixture of dyes of the formula

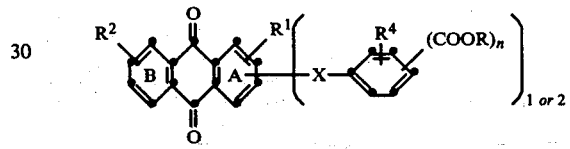

wherein: either or both of rings A and B may contain in any position thereon one or two groups of the formula

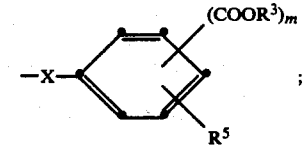

R and $R^3$ each is hydrogen, lower alkyl or lower hydroxy alkyl; $R^1$, $R^2$, $R^4$ and $R^5$ each represents hydrogen or 1–3 substituents independently selected from lower alkyl, lower alkyl substituted with lower alkoxy, phenyl, Cl, Br, or lower alkanoylamino, lower alkoxy, lower alkoxy substituted with lower alkoxy, phenyl, Cl, Br, or lower alkanoylamino, chlorine, bromine, amino, lower alkylamino, lower alkylamino substituted with lower alkoxy, cyclohexyl, phenyl, Cl, Br, or lower alkanoylamino, arylamino, arylthio, aroylamino, lower alkylsulfonyl, lower alkylthio, lower alkanoylamino, and cyclohexylamino, wherein X is —S— or —NH—; n is 1 or 2; and m is 0, 1, or 2.

3. The composition of claim 1 wherein the polyester has an I.V. of from about 0.65 to about 0.8 and is prepared from an acid component, comprised of terephthalic acid, isophthalic acid, mixtures thereof, and up to about 30 mole % of one or a mixture of modifying acids, and a diol component comprised of ethylene glycol, 1,4-cyclohexane diol, mixtures thereof, up to about 5 mole % diethylene glycol, and up to about 25 mole % of one or a mixture of other modifying diols.

4. The composition of claim 2 wherein the dye component is 1,5-bis(2-carboxyphenylthio)anthraquinone or 1,5-bis(o-carboxyanilino)anthraquinone or mixtures thereof, each being present in a concentration of from about 1.0 part per million to about 3.0 percent by weight of the polyester.

5. The composition of claim 1 wherein the polyester has an I.V. of from about 0.65 to about 0.8, is prepared from at least about 90 mole percent terephthalic acid, and a diol component comprised of at least about 90 mole percent ethylene glycol, up to about 10 mole % 1,4-cyclohexanedimethanol, and up to about 5 mole % diethylene glycol, and contains from about 2.0 to about 1500 ppm of one or a mixture of the copolymerized dyes, and from about 10 to about 1,000 ppm of one or a mixture of the infrared absorbent compounds.

6. The composition of claim 1 wherein the polyester is prepared from terephthalic acid and a diol component comprising ethylene glycol, up to about 5 mole % of diethylene glycol, and up to about 5 mole % of 1,4-cyclohexanedimethanol based on total moles of diol, and contains from about 20 to about 100 ppm of one or a mixture of the infrared absorbent compounds wherein $R^6$ and $R^7$ are either methyl or ethyl.

7. The composition of claim 2 wherein the polyester is prepared from at least about 90 mole % terephthalic acid and a diol component comprised of at least about 90 mole % ethylene glycol, up to about 10 mole % 1,4-cyclohexanedimethanol, and up to about 5 mole % diethylene glycol, each dye is present in reacted form in a concentration of from about 2.0 to about 1500 ppm, and wherein from about 5 to about 200 ppm of copper phthalocyanine is admixed therewith, said parts being per million parts of the polyester.

8. The composition of claim 2, wherein the dye component comprises one or both of the dyes of the formulae

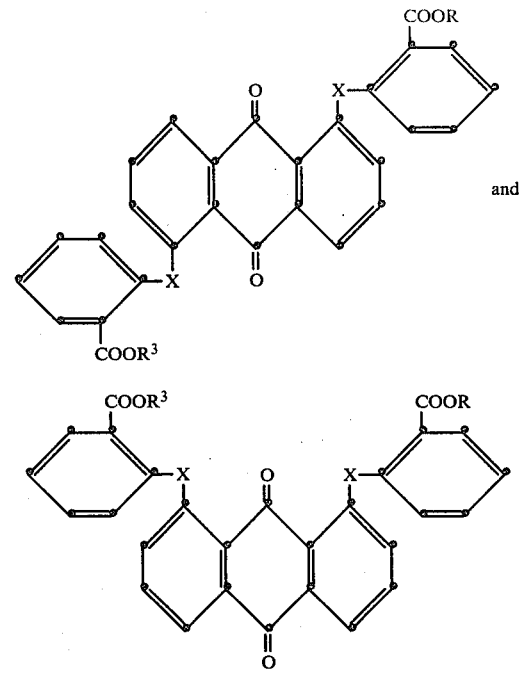

wherein X, R and $R^3$ are as defined therein.

9. The composition of claim 1 wherein $R^6$ and $R^7$ are each selected from alkyl of 1–10 carbons, cyclohexyl and phenyl, and the infrared absorbent compound or mixture thereof is present in a concentration of from about 10 to about 1,000 ppm.

10. An article formed from the composition of claim 1.

11. An article formed from the composition of claim 2.

12. A blow-molding, bottle parison formed from the composition of anyone of claims 1–9, 13 and 14.

13. The composition of claim 2 wherein the polyester has an I.V. of from about 0.65 to about 0.8, is prepared from at least about 90 mole percent terephthalic acid, and a diol component comprised of at least about 90 mole percent ethylene glycol, up to about 10 mole % 1,4-cyclohexanedimethanol, and up to about 5 mole % diethylene glycol, and contains from about 2.0 to about 1500 ppm of one or a mixture of the copolymerized dyes, and from about 10 to about 1,000 ppm of one or a mixture of the infrared absorbent compounds.

14. The composition of claim 2 wherein the polyester is prepared from terephthalic acid and a diol component comprising ethylene glycol, up to about 5 mole % of diethylene glycol, and up to about 5 mole % of 1,4-cyclohexanedimethanol based on total moles of diol, and contains from about 20 to about 100 ppm of one or a mixture of the infrared absorbent compounds wherein $R^6$ and $R^7$ are either methyl or ethyl.

* * * * *